Oct. 29, 1963
H. HABICHT
3,108,670
ROLLER CLUTCH
Filed May 9, 1961
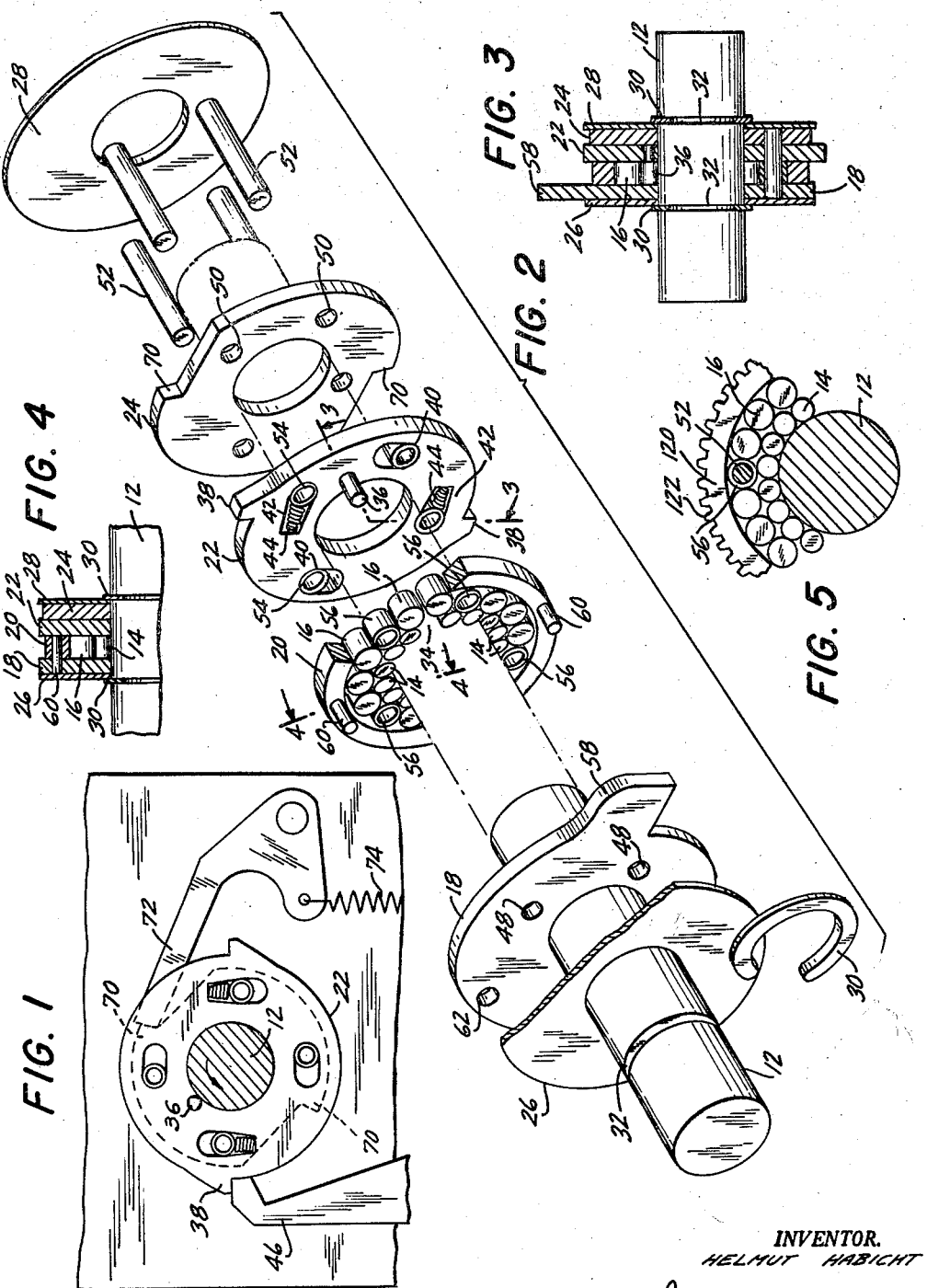
INVENTOR.
HELMUT HABICHT
BY James and Franklin
ATTORNEYS

United States Patent Office

3,108,670
Patented Oct. 29, 1963

3,108,670
ROLLER CLUTCH
Helmut Habicht, Park Ridge, N.J., assignor to Mite Corporation, New Haven, Conn., a corporation of Delaware
Filed May 9, 1961, Ser. No. 108,919
6 Claims. (Cl. 192—27)

This invention relates to clutches, and more particularly to a roller clutch characterized by long wear.

A clutch which is sensitive, non-chattering, simple in construction, and compact in dimension is disclosed in U.S. Patent 2,965,204, issued December 20, 1960, to Bernard Howard and entitled "Multiple Clutch." The general object of the present invention is to improve clutches, and more particularly to improve clutches of the type disclosed in the aforesaid patent.

In that clutch, as in most clutches, the clutch engagement is obtained by jamming rollers against sloping cam or wedge surfaces, and any ensuing clutch wear is concentrated in a very small area on the said wedge surfaces. Such wear eventually causes malfunction of the clutch, and to prolong the life of the clutch it is necessary to use inserts of extremely hard material for the wedge surfaces. Even with such hardened inserts there is eventual wear because of the concentration of the stress and wear at the same part of each wedge surface.

The primary object of the present invention is to overcome this difficulty, and to provide a clutch in which the usual sloping wedge surfaces are eliminated and are replaced by rollers which provide automatically changeable and renewable wedge surfaces. In preferred form I employ a substantially full complement of inner or jamming rollers. These are in collateral or side-by-side rolling relation, superficially resembling a conventional roller bearing. However, instead of being surrounded by a smooth bearing race, these inner rollers are surrounded by another full complement of outer rollers. These again are in side-by-side relation, and are surrounded by a roller race disc or ring, against which they may be forced outward or jammed by the inner or jamming rollers. Because of the large number of rollers, and the fact that they are individually rotatable to random positions when the clutch is not engaged, the clutch wear is distributed over a tremendous overall surface area, thus enormously increasing the operating life of the clutch.

Further objects of the invention are to apply the foregoing features to a clutch built up of flat discs which may be stamped to configuration; which may have one or more stop teeth to operate as a single revolution or fractional revolution clutch; which may have one or more back stop teeth to prevent chatter; which may be driven by a simple driving member which preferably is the power shaft itself; and which is well adapted for compact assembly of a series of clutches along a single driving shaft.

To accomplish the foregoing objects, and other more specific objects which will hereinafter appear, my invention resides in the clutch elements and their relation one to another as are hereinafter more particularly described in the following specification. The specification is accompanied by a drawing in which:

FIG. 1 shows the relation of the clutch to a stop finger and an anti-chatter dog;

FIG. 2 is a perspective view showing the parts of the clutch in disassembled relation;

FIG. 3 is a section through the clutch taken approximately in the plane of the angled lines 3—3 of FIG. 2;

FIG. 4 is a fragmentary section taken approximately in the plane of the line 4—4 of FIG. 2; and FIG. 5 is a fragmentary transverse section explanatory of a modification in which the clutch output member is a gear instead of a cam.

Referring to the drawing, the clutch comprises an inner driving member 12 and an outer driven assembly. The outer driven assembly comprises a plurality of jamming rollers 14 in rolling contact with the inner driving member 12. There are also a plurality of outer rollers 16 in contact with the jamming rollers 14. The rollers are confined by a housing, which may be made up of discs 18, 20, 22, and 24. In the present case there are also two thinner retaining discs 26 and 28, and the assembly is held together by snap rings 30 received in grooves 32 in shaft 12, as is best shown in FIG. 3. The shaft, the rollers, and the housing are so relatively dimensioned that the shaft or inner driving member moves the jamming rollers 14 against the outer rollers 16. The inner rollers jam the outer rollers against the roller race ring or disc 20, so that the parts all turn in unison, with the outer rollers 16 replacing the usual sloping wedge surfaces, and constituting automatically changeable and renewable wedge surfaces to afford long clutch wear.

In preferred form there is a complete complement of outer rollers 16. There is also a substantially complete complement of inner rollers 14, a single roller of the complement being omitted as indicated at 34 in FIG. 2, but this is replaced by a control pin 36 when, as here, the clutch includes a toothed stop disc 22. There is an outer roller cooperating with each inner roller, as shown in FIG. 5.

The stop disc 22 has one or more stop teeth 38, depending on whether it is to be used as a single revolution clutch, or a half revolution clutch, etc. In this case it is a half revolution clutch and there are two stop teeth. The disc 22 is movable over a small angle relative to the remainder of the housing, and for this purpose it has tangential slots 40 and 42. The slots 42 enclose compression springs 44 which bear against a part of the remainder of the clutch housing, and which urge the stop disc in a direction opposite to that effected by an operative stop tooth. Thus in FIG. 1 the inner driving member 12 rotates counterclockwise. The stop finger 46, when operative, bears against stop tooth 38 of stop disc 22, holding it against rotation, or effectively urging it clockwise. The compression springs 44 are compressed at this time, and consequently on release of the stop finger 46 the springs urge the stop disc in counterclockwise direction, thereby helping insure instantaneous engagement of the clutch. This is so because of the corresponding action of the control pin 36 on the inner rollers 14.

Referring to FIG. 2, the housing discs 18 and 24 are apertured at 48 and 50 to receive assembly pins 52. In the present case there are four such pins, and they pass through the four slots 40 and 42 of the stop disc 22. If desired, small spacer bushings 54 may be provided in the slots, in which case the pins 52 pass through the bushings 54. The latter have an axial length slightly greater than the thickness of disc 22, thereby insuring freedom of movement of disc 22 relative to the rest of the housing. It will be recognized that the compression springs 44 react against the pins 52 and thereby against the housing (other than the stop disc itself).

In the particular structure here shown the pins 52 pass through four of the outer rollers, these being the hollow rollers 56 clearly shown in FIG. 2. This construction has the advantage of reducing the overall diameter of the housing, compared to passage of pins through the roller race disc 20, and it has the further advantage of additionally and indeed independently locking the outer rollers to the clutch housing when the clutch is engaged. Thus the clutch action does not have to rely on wedging of the outer rollers 16 frictionally against the race disc 20.

In the particular assembly here shown the clutch drives a cam, the rise of which is shown at 58. Differently expressed, the apertured housing disc 18 functions also as an output disc, and the output in this case happens to be delivered by a cam. It will be understood that the output element might equally well be a gear, in which case the disc 18 could be circular and provided with a toothed periphery.

However, it should be understood that the roller race disc might equally well be used as an output disc, particularly when the output element is a gear, as shown in FIG. 5, in which the disc 120 replacing disc 20 has a toothed periphery 122. It could also be given a cam shape, and thus be used as an output cam.

To help additionally lock the parts of the housing together, and particularly to the output disc, the roller race disc 20 may be provided with two pins or dowels 60, which are received in mating holes 62 in output disc 18.

As so far described the assembly pins 52 might be secured in position by heading or riveting the same, but in the present case the structure is even simpler in that the pins are unheaded and are held against axial movement by imperforate retainer discs 26 and 28. The latter are confined by snap rings 30.

It has already been mentioned that the stop disc 22 is provided with a control pin 36 which is received between two adjacent inner rollers 14. The control pin 36 may be shouldered and riveted in position, as shown in FIG. 3, in which case it is non-rotatable, and for that reason it is preferably slightly smaller in diameter than the inner rollers 14. It controls the inner rollers in that when the stop disc is arrested by the stop finger 46, as shown in FIG. 1, the control pin 36 holds the inner rollers back so that they idle or rotate freely in running engagement with the shaft 12. At this time the outer rollers turn freely relative to one another and to the roller race disc 20. The shaft runs freely within the rollers, and the various rollers assume random and ever changing positions, which insures constant change and therefore "renewal" of the wedging surfaces. In operation, the stop disc 22 is so coupled to the jamming rollers 14 that the latter are held back against the influence of the inner driving member 12 whenever a stop tooth is operative. Conversely, the jamming rollers 14 are urged into jamming relation by the compression springs 44 when a stop tooth is released.

As so far described the disc 24 is merely an apertured housing disc to carry and locate the assembly pins 52. However, the clutch is preferably provided with antichatter means, and for this purpose the disc 24 is provided with back stop teeth 70. Referring to FIG. 1, these cooperate with a back stop dog 72. This is urged into engagement by spring 74, and thus the back stop comes into effect automatically whenever the stop finger 46 is effective. It will be understood that any of the housing discs other than the stop disc 22 may be used as a back stop disc, just as any of the said discs may be used as an output disc.

In one particular clutch the inner driving member or shaft 12 was 0.500 inch in diameter; there were nineteen inner rollers 14 having a diameter of 0.0927 inch; there were twenty outer rollers 16 having a diameter of 0.1268 inch; and the internal diameter of the roller race disc 20 was 0.9374 inch. The nineteen inner rollers were of course supplemented by the control pin 36, replacing one roller, and thus matching the inner and outer rollers, so that each inner roller cooperates with an outer roller.

It will be understood that the foregoing dimensions are given by way of example rather than in limitation of the invention. In general, the sum of the shaft radius, the inner roller diameter, and the outer roller diameter, must be slightly greater than the inside radius of the roller race disc.

It is believed that the construction, method of assembly, and operation of my improved roller clutch, as well as the advantages thereof, will be apparent from the foregoing detailed description. Heretofore with conventional sloping wedge surfaces, all of the clutch wear was concentrated in a limited area of these surfaces, and even with hard inserts, the life of the clutch was limited by the wearing of a radius or curve into the originally straight surface. By using outer rollers the wear is not limited to a single point, and instead the random rotation of the rollers provides changeable or renewed surfaces. The effective area of engagement to accept wear is the entire peripheral area of the roller, thereby prolonging the life of the clutch. The cost of manufacture is reduced by the elimination of the need for hardened inserts.

These advantages are enhanced and multiplied by the large number of inner and outer rollers. The inner driving member moves the jamming rollers against the outer rollers, and the latter against the housing. In addition the outer rollers are positively pinned to the housing and output disc by the four assembly pins. The large number of rollers and the fact that the rollers are individually free to rotate when they are not jammed together affords a tremendous surface area over which to spread the wear. Moreover, the clutch design requires a minimum of close tolerances, and a minimum of manufacturing operations other than the relatively simple stamping of parts from sheet material, or the cutting of parts from rods and tubes.

Another advantage of the present clutch is that the assembly of rollers and disc is reversible; that is, the same clutch and clutch parts may be designed to "overrun" or idle in either direction, without change other than a reversal of the direction of the stop tooth and back stop tooth. Even the change in tooth direction may be obtained by simply reversing the position of the disc, with the result that the only change needed in the clutch parts shown in FIG. 2 is to reverse the direction of projection of the control pin 36 from the stop disc 22.

It will be understood that while I have shown and described the invention in a preferred form, changes may be made in the structure shown, without departing from the scope of the invention as sought to be defined in the following claims.

I claim:

1. A clutch comprising an inner driving member and an outer driven assembly, said outer driven assembly comprising a complete complement of jamming rollers in side-by-side rolling relation around and in contact with the inner driving member, a complete complement of collateral outer rollers in side-by-side relation around and in contact with the jamming rollers, a housing around and confining said outer rollers, said driving member and rollers and housing being so dimensioned that the inner driving member moves the jamming rollers against the outer rollers in order to turn the housing, said housing including a stop disc having one or more stop teeth and movable through a small angle relative to the housing, a control pin projecting laterally from the stop disc to a position between two of the jamming rollers, said control pin having a diameter substantially that of the jamming rollers and substantially replacing one of the otherwise complete complement of jamming rollers, whereby the jamming rollers are held back against the influence of the inner driving member when a stop tooth its operative.

2. A clutch comprising an inner driving member and an outer driven assembly, said outer driven assembly comprising a complete complement of jamming rollers in side-by-side rolling relation around and in contact with the inner driving member, a complete complement of collateral outer rollers in side-by-side relation around and in contact with the jamming rollers, a housing around and confining said outer rollers, said driving member and rollers and housing being so dimensioned that the inner driving member moves the jamming rollers against the outer rollers and the latter against the housing in order to turn the housing, said housing including a stop disc having one or more stop teeth and movable through a small angle relative to the housing, said stop disc having one or more tangentially directed slots with compression springs bearing against a part of the housing to urge the stop disc in a direction opposite to the direction it is urged by an operative stop tooth, a control pin projecting laterally from the stop disc to a position between two of the jamming rollers, said control pin having a diameter substantially that of the jamming rollers and substantially replacing one of the otherwise complete complement of jamming rollers whereby the jamming rollers are held back against the influence of the inner driving member when a stop tooth is operative, and conversely are urged into jamming relation by the springs when a stop tooth is released.

3. A clutch as defined in claim 1 in which the outer driven assembly comprises flat discs assembled in coaxial relation, there being a retaining disc, an apertured disc, the aforesaid stop disc, a roller race disc, another apertured disc, and another retaining disc, pins, said apertured discs having aligned holes receiving said pins, said pins passing through tangentially directed slots in the stop disc, and each of said pins passing through an appropriate one of the outer rollers, the aforesaid complements of jamming rollers and outer rollers being confined between the stop disc on one side and the apertured disc on the other.

4. A clutch as defined in claim 2 in which the outer driven assembly comprises flat discs assembled in coaxial relation, there being a retaining disc, an apertured disc, the aforesaid stop disc, a roller race disc, another apertured disc, and another retaining disc, pins, said apertured discs having aligned holes receiving said pins, said pins passing through tangentially directed slots in the stop disc, and each of said pins passing through an appropriate one of the outer rollers, the aforesaid compression springs bearing against said pins, the aforesaid complements of jamming rollers and outer rollers being confined between the stop disc on one side and the apertured disc on the other.

5. A clutch as defined in claim 1 in which the outer driven assembly comprises flat discs assembled in coaxial relation, there being a retaining disc, a back stop disc with one or more back stop teeth, the aforesaid stop disc, a roller race disc, an output disc, and another retaining disc, connecting pins, said back stop disc and output disc having aligned holes receiving said connecting pins, said pins passing through tangentially directed slots in the stop disc, and each of said pins passing through one of the outer rollers, said roller race disc having additional means connecting the same to the output disc, the aforesaid complements of jamming rollers and outer rollers being confined between the stop disc on one side and the output disc on the other.

6. A clutch as defined in claim 2 in which the outer driven assembly comprises flat discs assembled in coaxial relation, there being a retaining disc, a back stop disc with one or more back stop teeth, the aforesaid stop disc, a roller race disc, an output disc, and another retaining disc, connecting pins, said back stop disc and output disc having aligned holes receiving said connecting pins, said pins passing through tangentially directed slots in the stop disc, and each of said pins passing through one of the outer rollers, the aforesaid compression springs bearing against said pins, said roller race disc having additional means connecting the same to the output disc, the aforesaid complements of jamming rollers and outer rollers being confined between the stop disc on one side and the output disc on the other.

References Cited in the file of this patent

UNITED STATES PATENTS

| | | |
|---|---|---|
| 1,195,520 | Snideman | Aug. 22, 1916 |
| 1,386,054 | Fowler | Aug. 2, 1921 |
| 1,956,934 | Stelzer | May 1, 1934 |
| 2,388,424 | Lund | Nov. 6, 1945 |
| 2,889,022 | Better et al. | June 2, 1959 |
| 2,965,204 | Howard | Dec. 20, 1960 |

FOREIGN PATENTS

| | | |
|---|---|---|
| 412,050 | Great Britain | June 21, 1934 |
| 646,573 | Germany | Aug. 28, 1937 |